United States Patent [19]

Markow

[11] Patent Number: 4,739,810

[45] Date of Patent: Apr. 26, 1988

[54] CONVOLUTED CONE WHEEL

[75] Inventor: Edward G. Markow, Oakdale, N.Y.

[73] Assignee: Grumman Aerospace Corporation, Bethpage, N.Y.

[21] Appl. No.: 77,629

[22] Filed: Jul. 20, 1987

Related U.S. Application Data

[62] Division of Ser. No. 745,533, Jun. 17, 1985, Pat. No. 4,705,087.

[51] Int. Cl.[4] .......................... B60B 9/00; B60B 1/06
[52] U.S. Cl. ........................................ 152/5; 152/12; 301/63 PW
[58] Field of Search ............... 152/5, 6, 7, 12, 323; 301/5 R, 63 PW

[56] References Cited

U.S. PATENT DOCUMENTS

| | | | |
|---|---|---|---|
| 612,171 | 10/1898 | McGiehan | 301/97 |
| 1,441,004 | 1/1923 | Kranz | 301/96 |
| 1,678,014 | 7/1928 | Manly | 152/326 |
| 1,785,995 | 12/1930 | Baker | 152/5 |
| 3,311,149 | 3/1967 | Mathiesen | 152/7 |
| 3,698,461 | 10/1972 | Markow | 152/5 |
| 3,861,435 | 1/1975 | Vincent et al. | 152/5 |
| 4,099,788 | 7/1978 | Trunnell | 301/105 |
| 4,350,196 | 9/1982 | Hampshire | 152/5 |
| 4,558,727 | 12/1985 | Gocata et al. | 152/5 |
| 4,705,087 | 11/1987 | Markow | 152/5 |

FOREIGN PATENT DOCUMENTS

| | | | |
|---|---|---|---|
| 349089 | 3/1905 | France | 152/5 |
| 6143 | 1/1906 | France | 152/12 |
| 1007671 | 3/1948 | France | |
| 0031801 | 3/1981 | Japan | 301/5 R |
| 16680 | of 1908 | United Kingdom | 152/12 |
| 1315160 | 8/1970 | United Kingdom | |

OTHER PUBLICATIONS

"Convolute Cone Wheel for Military Vehicles", M. A. Kopsco, Dec., 1974, Tech. Rep't. No. 12000, Tacom Mobility Systems Lab, Warren, Mich.
"Convolute Cone Wheel for Military Vehicles", M. A. Kopsco, Feb., 1976, Tech. Rep't. No. 12142, Tacom Mobility Systems Lab, Warren, Mich.

Primary Examiner—Robert B. Reeves
Assistant Examiner—R. Stormer
Attorney, Agent, or Firm—Richard G. Geib

[57] ABSTRACT

A non-pneumatic convoluted cone wheel having a hub section and a resilient section that has a ground-engaging rim at its peripheral outer edge portion to which a tire tread can be provided for the ground engaging rim including an internal element to vary the rate of the wheel with deformation under load which is turnable for changing stiffness with deformation of the resilient section.

17 Claims, 3 Drawing Sheets

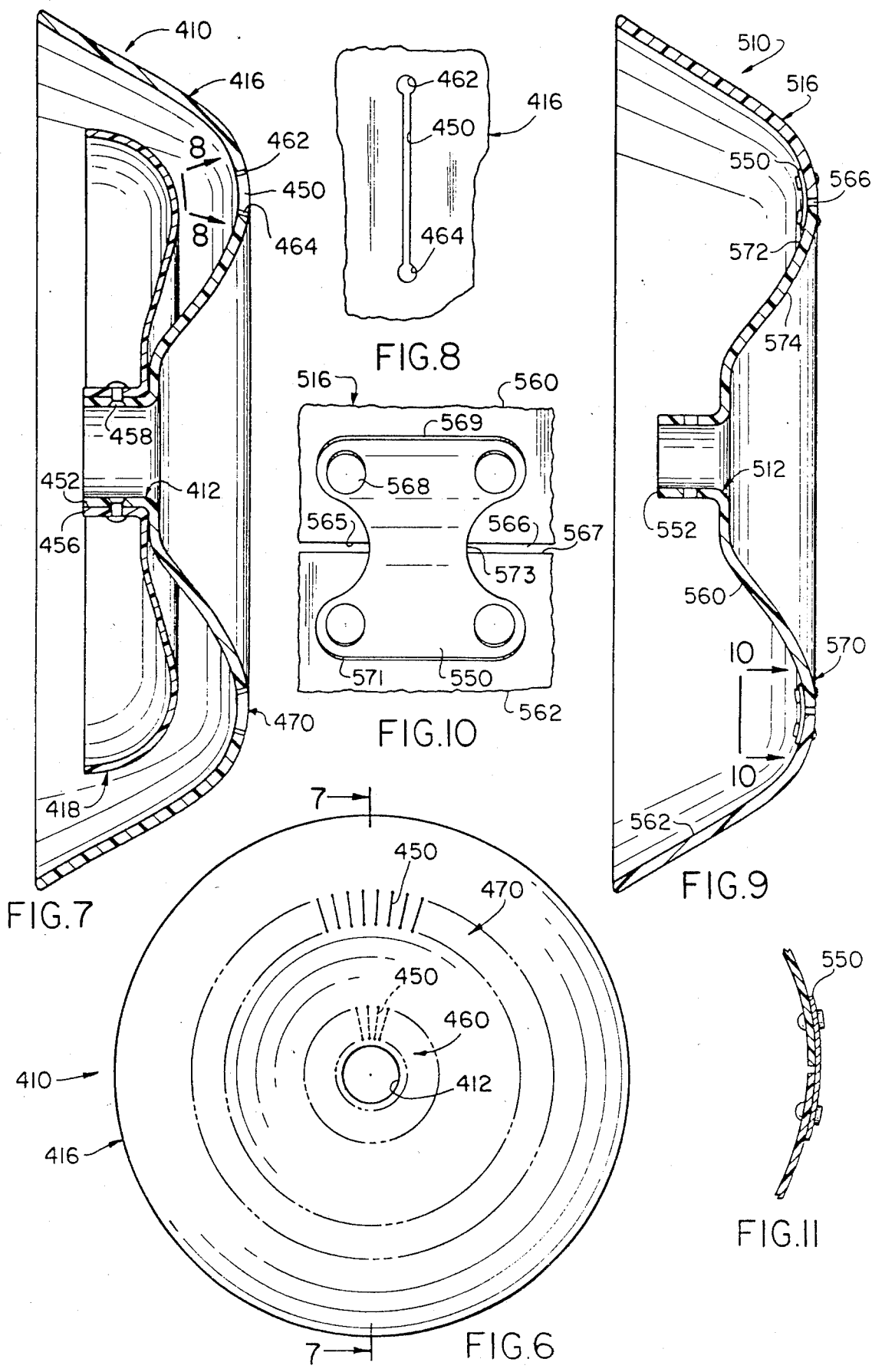

CONVOLUTED CONE WHEEL

This is a division, of application Ser. No. 745,533 filed June 17, 1985 and now U.S. Pat. No. 4,705,087.

BACKGROUND OF THE INVENTION

1. Field Of The Invention

This invention relates to vehicle wheels and, more particularly, to light-weight non-pneumatic cone wheels.

2. Discussion Of The Prior Art

For well over a half a century, automotive vehicles have conventionally run on a two component assembly comprising a pneumatic tire mounted on a spoked or solid wheel. The drawbacks of these two-component assemblies are well-known and include, among other disadvantages, their cost, weight, and the susceptibility of the pneumatic tire component to blow-outs and punctures. In their search for a solution to these problems, the prior art has investigated a number of design approaches. Among the more promising are designs in which the wheel itself is sufficiently resilient to allow the pneumatic tire to be eliminated without sacrifice in acceptable life and riding and handling properties. An example of a resilient non-pneumatic solid one-component wheel in the prior art is the elastic conoidal wheel which is the subject of U.S. Pat. No. 3,698,461 invented by the inventor of the present invention and assigned to a common assignee. That prior art design had a hub and a resilient conoidally shaped body extending from the hub to a ground-engaging rim which served as the running surface of the wheel. In addition to a wheel of conoidal design, a convoluted cone wheel was also disclosed. A further teaching of a convoluted cone wheel in the prior art is the design disclosed by W. J. Hampshire in U.S. Pat. No. 4,350,196. Hampshire discloses a wheel assembly which has a hub and an integrally formed rim portion having a more-or-less S-shaped radial cross-sectional configuration. These prior art designs provide a practical resilient wheel that allows the pneumatic tire normally required to be eliminated without an appreciable sacrifice in riding comfort or vehicle handling characteristics. However, these prior art resilient wheels have a spring rate when deflected under load influenced by their required overload strength properties and thus advantage cannot be taken of the improvement possible with a resilient wheel which has a rate that can be varied with deflection under load. Non-pneumatic resilient wheels typically suffer from having an inadequate footprint for good highway handling properties if the structure must also endure the expected 3-g dynamic loading with ample fatigue life. In addition, the prior art does not provide means by which the spring rate of a conoidal wheel can be changed such that the operating characteristics of the wheel can be tailored to meet various requirements. The compromise of having adequate strength for dynamic overload conditions and adequate suppleness at 1-g for good handling has not been satisfactorily solved in the prior art.

Accordingly, it is an object of the invention to provide a vehicle non-pneumatic wheel structure having the service, ride, and handling performance characteristics similar to a conventional pneumatic tire and wheel assembly at loads up through the design load of the wheel structure.

A further object of the invention is to decouple the loads imposed by impact dynamics from a more supple resilient structure tailored for desirable handling properties at a nominal 1-g loading.

It is another object of the invention to provide a non-pneumatic wheel structure having mechanical functions and safety characteristics that are superior to those of a conventional pneumatic tire and wheel assembly at loads above the design load of a pneumatic tire and wheel assembly.

A yet further object of the invention is to provide a resilient non-pneumatic convoluted cone wheel capable of large deformation whose rate with deflection under load can be tailored to meet specific design objectives.

Yet another object of the invention is to provide a variable-rate resilient non-pneumatic convoluted cone wheel which is of unitary lightweight high-strength construction which can be designed to simulate the appearance of a conventional wheel and pneumatic tire assembly.

A further object of the invention is to provide a variable-rate resilient non-pneumatic convoluted cone wheel which has the mechanical functions and riding characteristics of a conventional wheel and pneumatic tire assembly but which has a lower rolling resistance.

Another object of the invention is to provide a resilient nonpneumatic wheel which is simple in design; economical to manufacture, operate, and service; and capable of withstanding static, fatigue, and impact loads compatible with expected service requirements.

Other objects and advantages of the present invention will become apparent to those skilled in the art from the description to follow when read in conjunction with the drawings appended hereto.

SUMMARY OF THE INVENTION

The above-mentioned objectives are achieved by the present invention which provides a resilient non-pneumatic convoluted cone wheel having a hub section for receiving an axle and a resilient conoidal wheel body section forming a radially outward continuation of the hub section, the resilient section has a ground-engaging rim at its peripheral outer edge portion. If desired, a tire tread can be provided for the ground-engaging rim portion. Means are also provided to vary the spring rate of the wheel with deformation under load. The resilient section of the wheel is annularly dished in the axial direction to form a coaxial hollow semi-conoid of relatively thin cross-section having a circular radially and axially curving portion forming a continuation of the hub section and a circular reversedly curving substantially arcuate peripheral portion forming a continuation of the circular radially and axially curving portion. The spring rate of the resilient conoidal section of the wheel can be changed by means of a series of radial slots located coaxially around the resilient section in approximately the vertex region of the semi-conoid area thereof or at is radially inward region at approximately the juncture of the semi-conoid area with the hub section. Alternately, the resilient wheel body section can be made in two coaxial pieces with a radially inside piece and a radially outside piece whose edges abut in the vertex region. A series of elongated spring clips bridging the abutting edges and having the clip ends fastened to the opposite coaxial pieces can be provided to change the rate. In a further embodiment, opposing flanges can be formed in the abutting edges of the two pieces of the resilient conoidal section and they can be fastened together with a resilient gasket interposed therebetween to change the spring rate. A further means for varying the spring rate of the resilient conoidal section of the wheel is a resilient bump stop. The bump stop has a circular configuration (when viewed from the side) coaxial with but with a smaller radially outer diameter than the normal undeflected diameter of the rim of the resilient conoidal section. The outer peripheral edge of the bump stop terminates in a location which intercepts the path of the inside reversedly curved surface of the resilient conoidal section during the deformation thereof under conditions of increased load. When the resilient conoidal section deforms to a degree that brings it into contact with the resilient bump stop, the bump stop comes into play to retard further deformation, thus changing the spring rate of the wheel and utilizing two spring systems in series; the primiary conoidal section, and the bump stop.

DESCRIPTION OF THE DRAWINGS

For the purpose of illustrating the invention, there is shown in the drawings the forms which are presently preferred; however, it should be understood that the invention is not necessarily limited to the precise arrangements and instrumentalities here shown.

FIG. 6 is a side elevational view of a yet further embodiment of the wheel of the invention;

FIG. 7 is a diametric section taken along line 7—7 of the wheel of FIG. 6;

FIG. 8 is a fragmentary elevational view taken along line 8—8 of the wheel of FIG. 6;

FIG. 9 is a diametric section of another embodiment of the wheel of the invention;

FIG. 10 is a fragmentary elevational view taken along line 10—10 of the wheel of FIG. 9; and FIG. 11 is a fragmentary diametric section of an alternate design location for the spring clips of the FIG. 9 embodiment of the wheel of the present invention.

DESCRIPTION OF THE PREFERRED EMBODIMENTS

Figure 1:
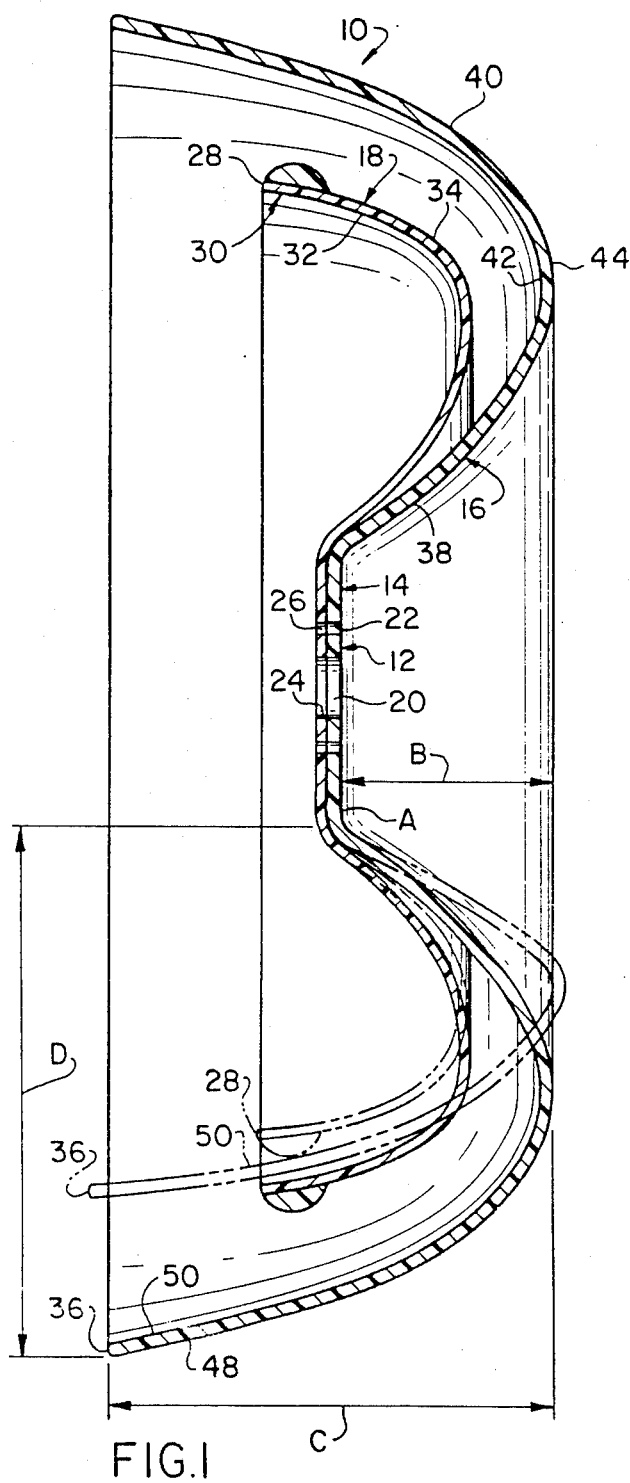
FIG. 1 is a diametric section of a wheel embodying the present invention.

With reference now to the drawings, FIG. 1 shows an embodiment 10 of the non-pneumatic convoluted cone wheel of the invention. Wheel 10 has a hub section 12, an integral web section 14 which forms a radial continuation of the hub section, a resilient annular toroidal wheel body section 16 extending radially outwardly from the web section, and a resilient bump stop 18 of circular configuration. Hub section 12 is suitably configured for mounting wheel 10 on a conventional vehicular wheel mount (not shown) and may have a centrally located through hole 20 for receiving an axle and a pattern of holes 22 located around central hole 20 for receiving the threaded fasteners (not shown) used to secure wheel 10 to the vehicle wheel mount. In the FIG. 1 embodiment, bump stop 18, which can be suitably fastened to hub section 12 as by riveting (not shown), is provided with an arrangement of through holes 24 and 26 matching holes 20 and 22 respectively of the hub section. Bump stop 18, which preferably is located on the wheel on the side adjacent the vehicle, has a radially outward peripheral edge 28 which is smaller in diameter than the wheel rim 36, is provided with means imparting resiliency to the bump stop. In the FIG. 1 embodiment, the peripheral portion 30 of the bump stop has an axially inwardly curving arcuate configuration that imparts resiliency to the bump stop. Thus, arcuate edge portion 30 has a concave section 32 facing the vehicle and a convex section 34 facing the inside surface of toroidal section 16. It will be appreciated that well known means other than that shown in FIG. 1 can be employed to impart the required resiliency to the bump stop.

In a convoluted cone wheel, the required resiliency in operation that is normally supplied by the pneumatic tire in the prior art is provided by a resilient conoidal wheel body section. In the present invention, the function is served by resilient annular toroidal wheel body section 16 which can be considered to extend radially outwardly from about diameter A of the wheel to its rim 36. Toridal section 16 has a circular radially and axially outwardly curving portion 38 forming a continuation of web section 14 and a circular reveresedly radially and axially inwardly curving portion 40. Toroidal section 16 thus has a concave inside portion 42 and a convex outside portion 44.

In the wheel of this invention, the design of the toroidal wheel body section 16 preferably is one in which the sum of the axial dimensions B & C of the section is approximately equal to twice the section depth D. (See FIG. 1) If the geometry is varied to one having a relationship less than two, the wheel stiffness is significantly increased such that it behaves more like a rigid wheel. A larger ratio will reduce the stiffness of the wheel but adverse lateral strains may begin to be introduced into the surface contact area of the wheel at approximately plus or minus 45° (viewed from the front elevation of the wheel) to the centerline of the footprint. It will be appreciated that, at the discretion of the designer, the diametric cross-sectional profile of the bump stop also can be essentially similar to that of the resilient toroidal section i.e., the sum of the axial dimensions of the bump stop can be approximately equal to twice the section depth thereof.

Figure 2:
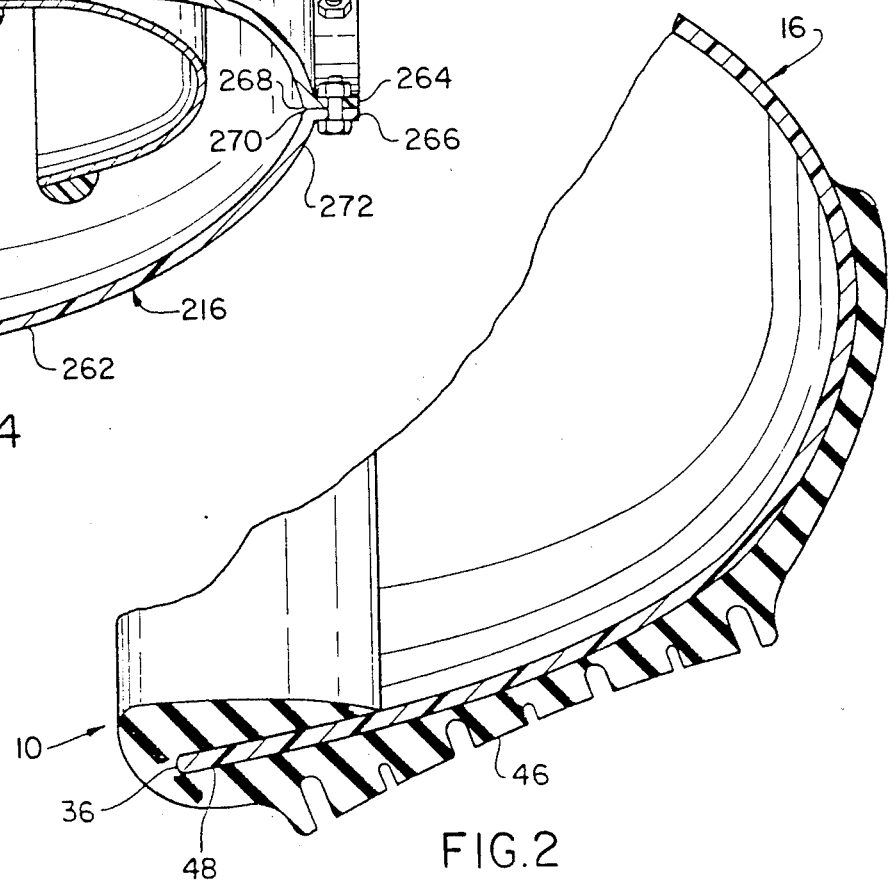
FIG. 2 is a fragmentary diametric section of an embodiment of the wheel of FIG. 1 whose ground-engaging rim portion is provided with a tread.

To enhance the wear and traction of wheel 10, wearing surface means such as a tread 46 (see FIG. 2) can be provided on the rim 48 area of the wheel. A solid tread, which may be made of rubber or other suitable elastometric substance, preferably is employed, but a design containing one or more openings or cavities or even a low-profile pneumatic belt-type tire can be used. The cross-section of the solid tread suitably has an unloaded concave shape designed so that the center band portion will lie flat on the road surface as the band portion passes under the wheel axle during each revolution. This results in a good load distribution and even wear during highway operation. The side bands of the tread, which do not make contact until off-road conditions are encountered, can have aggressive treads or cleats for increased traction in weak soil conditions. A certain amount of lateral scuffing will be encountered with a conoidal wheel. To reduce energy loss and excessive heating at highway speeds, the tread should be designed to accommodate as much as this scuffing motion as possible. To comply with these lateral motions elastically, the center band portion of the tread can incorporate deep circumferential grooves. Radial or transverse groove also can be provided to minimize the hoopwise stiffening effect of the tread as it rounds the leading and trailing "corners" of the deformed wheel in operation (In the interest of clarity, the tread 46 shown in FIG. 2 is not shown in FIG. 1. Although a tread is not shown in the drawings of the other embodiments of the invention, it will be appreciated that a tread can be provided as desired at the discretion of the designer.)

In operation when mounted on a vehicle, the rim 48 region of the resilient toroidal section 16 of the wheel beneath and on either side of the wheel axle will deform and flatten under load. Preferably the wheel is designed such that when its rim deforms approximately 10% under a load, the inside surface 50 of the wheel rim region will deform, as indicated in broken lines in FIG. 1, such that it is brought up against the peripheral edge 28 portion of the bump stop 18. Further deformation of the wheel thus will be resisted not only by the stored energy in the toroidal section 16 but also by the stored energy of the bump stop 18. This changes the spring rate of the wheel under deformation such that the wheel has dual rates with deformation, with one spring rate during initial deformation and a second, stiffer, rate when the bump stop comes into play.

Non-pneumatic convolute cone wheels are fatigue sensitive. Designs to accept high-"g" impact loads severely limit the footprint size in normal operation. A softer spring-rate elastic structure would permit the wheel to overcome the footprint problem, but difficulties with the wheel over-deflecting under high-g loads normally prohibits this design approach. However, in my invention, possible problems with over-deformation are avoided by the resilient bump stop which limits the deformation undergone by the wheel. It is thus possible to provide a design in which the deformation at 1.5-g is limited to a value determined by the handling properties of the wheel. In my invention, the non-pneumatic convoluted cone wheel can be designed to accept impact loads above 1.5-g and a 1-g static load to provide an adequate footprint for handling. All dynamic bottoming loads are attenuated by the bump stop. The design is not penalized by measures that would have to be taken normally to accommodate high-g loads, thus it has reduced weight and improved handling performance and reduced ride harshness.

Figure 3:
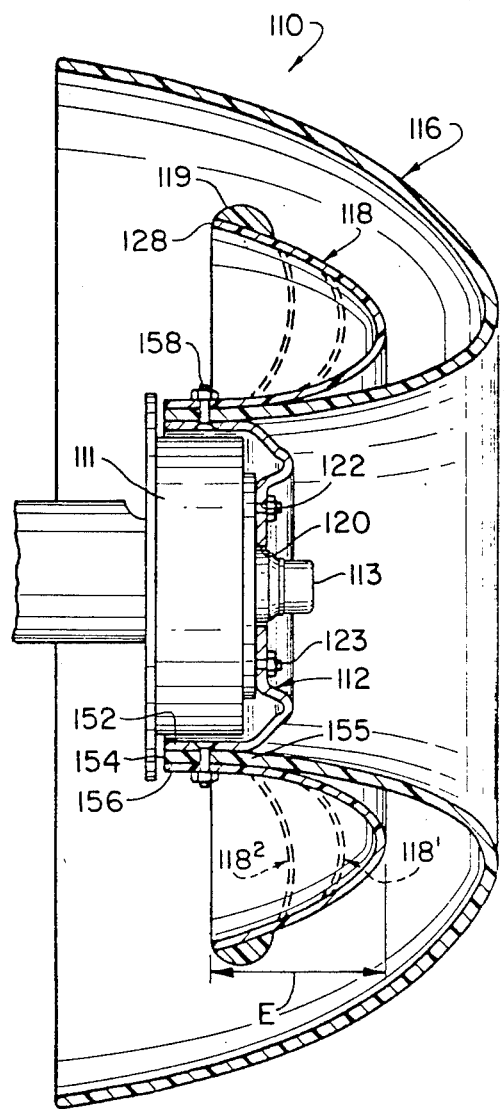
FIG. 3 is a diametric section of yet another embodiment of the wheel of the present invention.
Figure 3A:
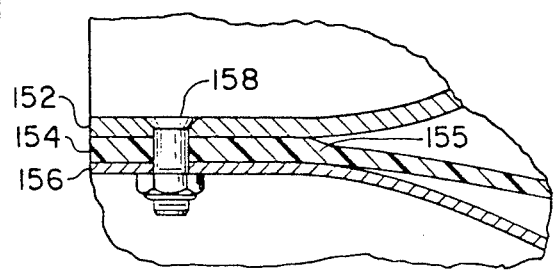
FIG. 3a is an enlarged fragmentary cross-sectional view of the wheel of FIG. 3 showing the construction in greater detail.

A further embodiment 110 of the non-pneumatic convoluted cone wheel of the invention is shown in FIG. 3. Wheel 110 has a hub section 112, a resilient annular toroidal wheel body section 116 extending radially outwardly from the hub section, and a resilient bump stop 118 of annular configuration similar to that of toroidal section 116. A low-friction elastomeric ring 119 can be provided around the edge portion 128 to avoid possible chafing between the bump stop and the resilient section 116. Hub section 112 is suitably configured for mounting wheel 110 on a conventional vehicular wheel mount such as a brake drum 111. A centrally located through hole 120 for receiving the end 113 of the vehicle axle and a pattern of holes 122 for receiving the threaded wheel studs 123 of the vehicle wheel mount can be provided to enable the wheel to be mounted. In this embodiment, the hub section 112 has an axially inwardly disposed annular, peripheral, cylindrical flange 152 for receiving the vehicle brake rotor or drum 111. In this design, the radially innermost cylindrical edge portions 154 and 156 of toroidal section 116 and bump stop 118 respectively are fastened to the outer periphery of flange 152 by a peripheral arrangement of suitable fasteners such as bolts 158. In the arrangement, toroidal section edge portion 154 is sandwiched between flange 152 and bump stop edge portion 156 to provide the requisite clamp-up forces for the assembly. As indicated in FIG. 3a, edge portion 154 of resilient section 116 can be suitably thickened as at 155 to properly distribute the loads thereon. Flush-head countersunk bolts 158 can be used in this embodiment to fasten the foregoing together while providing the proper clearance for the vehicle's brake drum 111.

In FIG. 3, wheel 110 is shown with a bump stop 118 having a configuration in diametrical cross section substantially duplicating the diametrical cross section of toroidal wheel body section 116. It will be appreciated, however, that a reduction in the section depth E of the bump stop as indicated in the broken-line configurations $118^1$ and $118^2$ will have the effect of increasing the spring rate to thereby influence the step function of the arrangement accordingly. This increase in spring rate with a reduction in the section depth of the bump stop will, of course, apply with respect to the bump stops in the other embodiments of my invention.

The convoluted cone wheels of this invention can be fabricated out a wide range of suitable metallic and non-metallic materials. For example, in the FIG. 1 embodiment, the various components of wheel 10 can be molded out of a composite such as fiberglass reinforced epoxy resin. If a metal is used in the wheel, cryoformed stainless steel or a heat-treated low-alloy high-strength steel would be leading candidate materials for the resilient elements of the wheel. Generally, because of cost and other considerations, a fiberglass reinforced epoxy resin will be selected. However, in an installation such as in FIG. 3 where the wheel is to be mounted on the brake drum of the vehicle, the wheel in operation will be subjected to an intense heat input from the brake. Therefore, when, for example, a composite material is used in the resilient section 116 of the wheel 110 of FIG. 3, the wheel hub 112 is made of metal to avoid a thermal degradation of strength of the resilient material. With a metal hub 112, the heat transfer to the resilient section 116 of the wheel is in a temperature range that can be tolerated by the generally used composite materials. Thus, it is not necessary to employ a more expensive high-temperature grade plastic material in the design of resilient section 116.

Wheel 110 of the FIG. 3 embodiment has substantially similar operating characteristics to wheel 10 of the FIG. 1 embodiment and differs therefrom essentially in the means provided for mounting the wheel on a vehicle.

Figure 4:
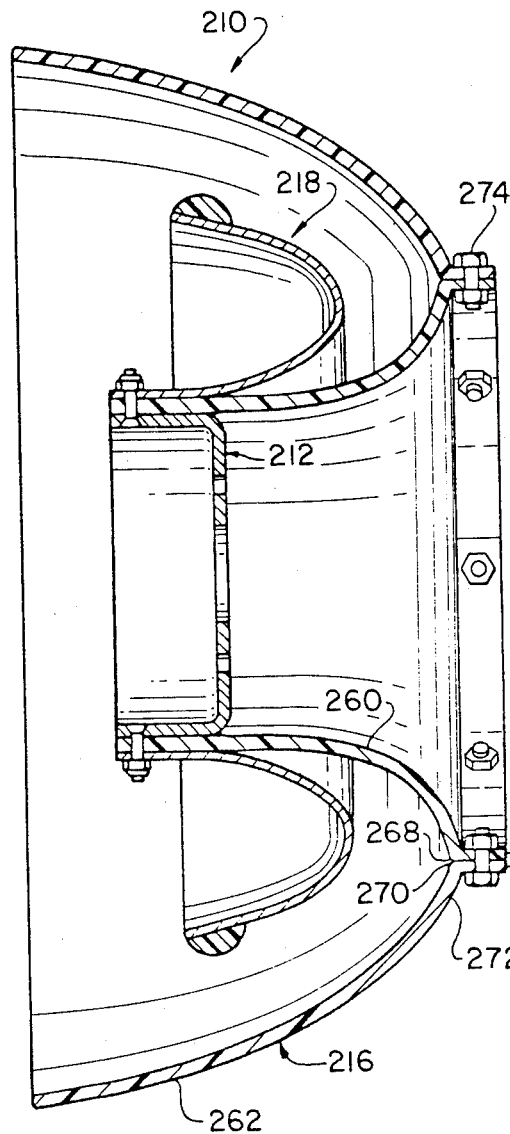
FIG. 4 is a diametric section of a further embodiment of the wheel of the present invention.

Yet another embodiment 210 of the convoluted cone wheel of the invention is shown in FIG. 4. As in wheel 110 of the FIG. 3 embodiment wheel 210 has a hub section 212, a resilient annular toroidal wheel body section 216 extending radially outwardly from the hub section, and a resilient bump stop 218 of circular configuration. As in the FIG. 3 wheel 110, suitable means are provided in the hub section to enable wheel 210 to be mounted on a vehicle and similar flange means are used to install the toroidal section 216 and bump stop 218 on hub section 212. Substantially the only difference between the FIGS. 3 and 4 embodiments is that the toroidal section 216 of wheel 210 is constructed in two semi-hemispheric segments 260 and 262. Segment 260 has a circular radially and axially outwardly curving configuration which is fastened to and extends from hub 212. Segment 262 has a circular reversedly radially and axially inwardly curving configuration. Each segment has an axially extending flange 264 and 266 respectively around the adjoining peripheral edges 268 and 270 at the vertex 272 of the toroidal section. An arrangement of suitable fasteners such as bolts 274 are used peripherally to secure segments 260 and 262 together.

Wheel 210 has substantially the same dynamic response to static and impact loads as the wheel 110 embodied in FIG. 3 and its operating characteristics are equivalent thereto. Also, as in the previous embodiments, the resilient bump stop 218 gives the wheel a dual-modulus spring rate.

Figure 5:
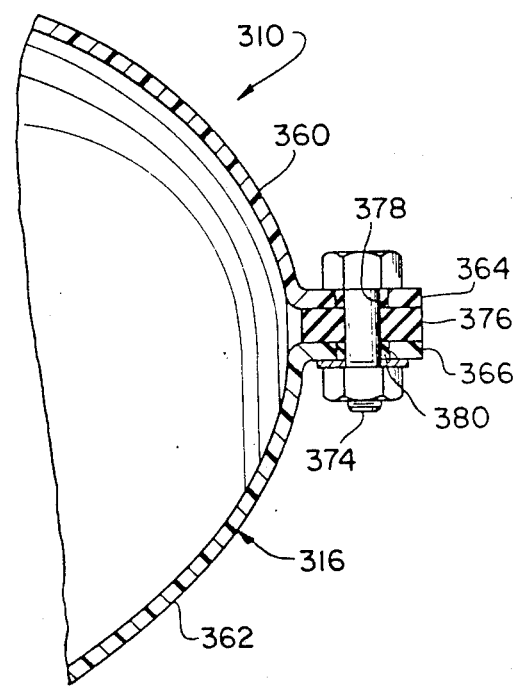
FIG. 5 is a fragmentary diametric section of the resilient annular section of still another embodiment of the wheel of the invention.

FIG. 5 illustrates an alternative design for the wheel 210 embodied in FIG. 4. The wheel 310 of FIG. 5 has a hub section (not shown) and a two-piece resilient toroidal wheel body section 316 comprising two semi hemispheric segments 360 and 362. Segment 360 has a circular radially and axially outwardly curving configuration which is fastened to and extends from the wheel hub section. Segment 362 has a circular reversedly radially and axially inwardly curving configuration. Each segment has an axially extending flange 364 and 366 respectively which are fastened together as by means of suitable fasteners such as bolts 374 which preferably are of a type that will accept or minimize bending loads imposed thereon by flexure of the flange. However, unlike wheel 210 embodied in FIG. 4 in which the segments are fastened together with the facing surfaces of the flanges in intimate contact, a rubber or elastomeric gasket 376 is interposed between the facing surfaces of flanges 364 and 366 around the entire circumference thereof. To permit the necessary freedom of movement for the bolts during flexure of the flanges, rubber or elastomer sleeves or grommets 378 and 380 are provided for each bolt. Gasket 376 has a spring rate different from that of resilient segments 360 and 362 such that it acts as a flexible joint to vary the stiffness of the cone wheel. By properly selecting an elastomer to obtain one with a desired resiliency, a designer can tailor the stiffness of the wheel to meet various requirements.

It is also feasible to tailor the spring rate of the wheel of my invention by means of radial slots such as those illustrated in wheel 410 shown in FIGS. 6–8. Wheel 410 has a hub section 412, a resilient annular toroidal wheel body section 416 which forms a continuation of and extends radially outwardly from the hub section, and a bump stop 418. Bump stop 418 has a circular configuration in plan view with a central aperture that is provided with an axially inwardly extending cylindrical flange 456 which is a tight fit over the axially inwardly extending cylindrical flange 452 of the hub section. The two flanges are securely fastened together as by bonding or by means of suitable fasteners such as flush-head rivets 458. It will be seen that the wheel as described to this point, with the exception of minor variations in the hub area thereof, is substantially identical to the wheel 10 of FIG. 1. As in the other wheels of this invention, the necessary resilience required for the efficient functioning of the wheel is provided by the toroidal section 416. In wheel 410, the spring rate and footprint characteristics which are highly important to the handling properties of the wheel are tailored by slotting the resilient toroidal wheel body section 416 with an annular arrangement of through slots 450 of various lengths, widths, and spacing. As shown in FIGS. 6 and 7, the slots can be arranged in an annular pattern at the point of greatest curvature in the curved profile of resilient section 416 such as at the vertex 470 of the section. Typically, the slots 450 can be about 0.060 in. wide, about 3 in. long, and they can be spaced about 1 in. apart. The width, length, and spacing of slots 450 are determined empirically for the desired elastic deformation characteristics of the wheel. Preferably, each slot 450 has the general shape shown in FIG. 8 in which each end of each slot is relieved with an aperture 462 and 464 having a diameter greater than the slot width such that a stress build-up in the slotted area of section 416 of the wheel during deformation is relieved. Alternately, instead of a pattern of slots at vertex area 470, an annular pattern of slots can be provided for varying the stiffness of the wheel at any other transition point in the curvature of the profile of section 416 as, for example, at annular area 460 adjacent hub section 412. If the requirements so dictate, of course, the wheel can be slotted at both areas 470 and 460 such that the stiffness of the wheel is reduced accordingly.

In wheel 510 embodied in FIGS. 9 and 10 the spring rate of the wheel is tailored by spring clip means 550. Wheel 510 has a hub section 512, and a resilient annular toroidal wheel body section 516 which forms a continuation of and extends radially outwardly from the hub section Resilient toroidal section 516 of wheel 510 is constructed in two semi-hemispheric segments 560 and 562. Segment 560 has a circular radially and axially outwardly curving configuration which extends from hub 512. Segment 562 has a circular reversedly radially and axially inwardly curving configuration. Segments 560 and 562 are fastened securely together with a slight clearance gap 566 therebetween by spring clips 550 arranged around the adjoining edges 565 and 567 of the segments. As is evident from FIG. 9, the edges of the segments preferably are joined together at a location corresponding to the vertex 570 of the toroidal section 516. As best shown in FIG. 10, each spring clip 550 can have a more-or-less hour-glass shaped configuration in plan view with widened portions 569 and 571 at each end and a necked-in midsection 573 which serves as a cantilever spring means between the segments. End 569 of the spring clip is fastened to segment 560 as by bonding or by suitable fasteners such as rivets 568 and end 571 of the clip is similarly fastened to segment 562. Clips 550 are located on the inside concave surface 572 of the resilient toroidal section but they can be located as indicated in FIG. 11 on the outside, convex surface 574 at the discretion of the designer. The designer can select an appropriate stiffness for the spring clips and for the resilient toroidal section to produce a desired spring rate profile for the wheel under deformation. As is the case with slotting the wheel to vary its spring rate, the size, spacing, and material of the clips will be determined by the desired elastic deformation. A 0.040 or 0.050 in. thick stainless steel spring clip which is one-in. wide at its widest dimension and spaced one-in. apart has been found suitable in practice.

It will be appreciated that design features of one embodiment of the invention such as the slots 450 of the wheel 410 embodiment can be incorporated, where appropriate, in other embodiments of the invention. Further, should it be advantageous to do so in certain applications, various embodiments of the wheels of the invention can be operated without bump stops. It will be understood, also, that the wheel can be mounted, if desired, with the annular concave side thereof facing outwardly away from the vehicle.

Although shown and described in what are believed to be the most practical and preferred embodiments, it is apparent that departures from the specific methods and designs described and shown will suggest themselves to those skilled in the art and may be made without departing from the spirit and scope of the invention. I, therefore, do not wish to restrict myself to the particular constructions described and illustrated, but desire to avail myself of all modifications that may fall within the scope of the appended claims.

Having thus described by invention, what I claim is:

1. A non-pneumatic convoluted cone wheel comprising:
    a hub section for receiving an axle;
    a resilient torodial wheel body section extending radially outwardly from said hub section and having a rim at its peripheral edge portion distal from said hub section, said rim having an inside surface portion and an outside ground-engaging portion, said toroidal section being formed in two coaxial pieces with a radially inside circular radially and axially outwardly curving portion and a radially outside circular reversedly radially and axially curving portion such that said toroidal section has an annular, concave inside surface and an annular convex outside surface, means for joining the contiguous edges of said coaxial pieces;
    and means automatically operative in all conditions of operation for changing the spring rate upon a certain amount of deformation of said toroidal section.

2. The convoluted cone wheel defined in claim 1 where in the means for changing the spring rate is a resilient bump stop.

3. The convoluted cone wheel defined in claim 2 wherein the resilient bump stop has a circular configuration in plan view coaxial with said toridal section and having a smaller diameter than the normal undeformed diameter of the rim of the toroidal section, the outer peripheral portion edge of said bump stop terminating radially in a position intercepting the path of the inside surface portion of said toroidal section during the deformation thereof under conditions of increased load.

4. The convoluted cone wheel defined in claim 3 wherein the resilient bump stop has a spring rate under deformation greater than that of the toroidal section whereby when the inside surface of said toroidal section contacts said bump stop, further deformation of said wheel is resisted by the combined stiffness of both the bump stop and the toroidal section such that an overstressing of said toroidal section under load is prevented.

5. The convoluted cone wheel defined in claim 4 wherein the radially outward peripheral region of the bump stop has a conoidal configuration having a cross-sectional profile substantially similar to that of the toroidal section of said wheel and the convex surface thereof faces the inside surface of said toroidal section.

6. The convoluted cone wheel according to claim 5 in which the hub section has a substantially planar vertical disk portion which has a peripheral axially inwardly extending cylindrical flange and the radially inside peripheries of the resilient toroidal section and the bump stop have a cylindrical edge portion coaxial with said flange and fitted thereon with the cylindrical portion of said toroidal section interposed between said cylindrical portion of said bump stop and said hub flange with a peripheral arrangement of fasteners through said flange and said cylindrical edge portions for fastening said edge portions to said flange with the requisite clamping forces on the assembly.

7. The convoluted cone wheel according to claim 6 in which the cylindrical edge portion of said resilient toroidal section is thickened to properly distribute the loads thereon.

8. The convoluted cone wheel according to claim 6 in which said wheel is mounted on the brake drum wheel mounting of a vehicle.

9. The convoluted cone wheel according to claim 8 in which the hub section is metallic and the resilient toroidal section is made of a composite material, said hub section being provided with an operating clearance between it and the brake drum such that heat therefrom into said hub section in operation is substantially a radiant heat transfer phenomenon whereby a heat input into said toroidal section of a magnitude sufficient to cause thermal degradation of the composite material thereof is avoided.

10. The convoluted cone wheel defined in claim 1 wherein the means for joining the contiguous edges of the coaxial pieces is a circumferential arrangement of spring clips, the spring clips each having one of their ends fastened on one of the coaxial pieces and the other of their ends fastened on the other coaxial piece, the portion of said spring clips intermediate said fastened end forming a cantilever spring, whereby the action of said cantilever spring portions of said clips during deformation of the wheel under load changes the spring rate of the resilient toroidal section.

11. The convoluted cone wheel defined in claim 10 wherein the spring clips each are substantially rectangular strips of resilient sheet material.

12. The convoluted cone wheel defined in claim 2 wherein the means for joining the contiguous edges of the coaxial pieces is an axially outwardly projecting integral flange provided along both of said contiguous edges and wherein said flanges are fastened together to secure said coaxial pieces together for operation.

13. The convoluted cone wheel defined in claim 1 wherein the means for joining contiguous edges of the coaxial pieces is an axially outwardly projecting integral flange provided along both of said contiguous edges, said flanges being fastened together to secure said coaxial pieces together for operation, and wherein a peripheral elastometric gasket is interposed between the mating surfaces of said flanges whereby the resilience of said gasket changes the spring rate with deformation of said wheel.

14. The convoluted cone wheel according to claim 1 in which the sum of the axial dimensions in width of the circular radially and axially outwardly curving portion and the circular reversedly radially and axially inwardly curving portion of the resilient annular body section is approximately twice the section radial depth of said resilient annular body section.

15. The convoluted cone wheel according to claim 1 in which said wheel has an annular web section interposed between the hub section and the resilient annular toroidal section.

16. The convoluted cone wheel according to claim 15 in which the annular web section is resilient.

17. The convoluted cone wheel according to claim 15, in which the annular web section is integral with the hub section and the resilient annular toroidal section.

* * * * *